June 12, 1928.
J. E. ROBBINS
1,673,125
HAY BALER
Filed July 25, 1924
7 Sheets-Sheet 1
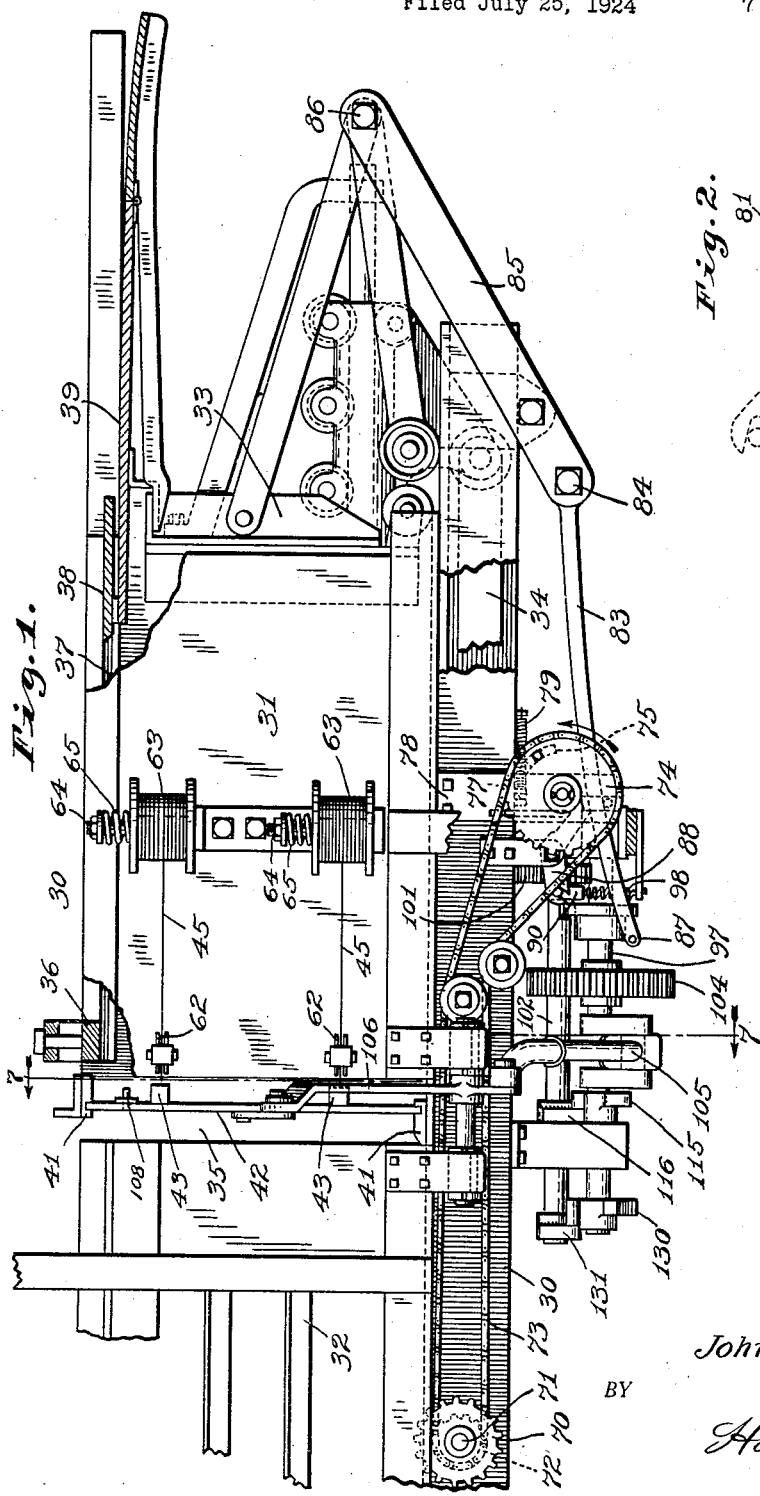
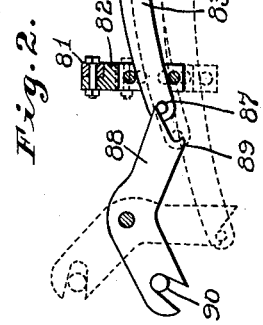
INVENTOR.
John E. Robbins,
BY
Hood + Hahn.
ATTORNEYS

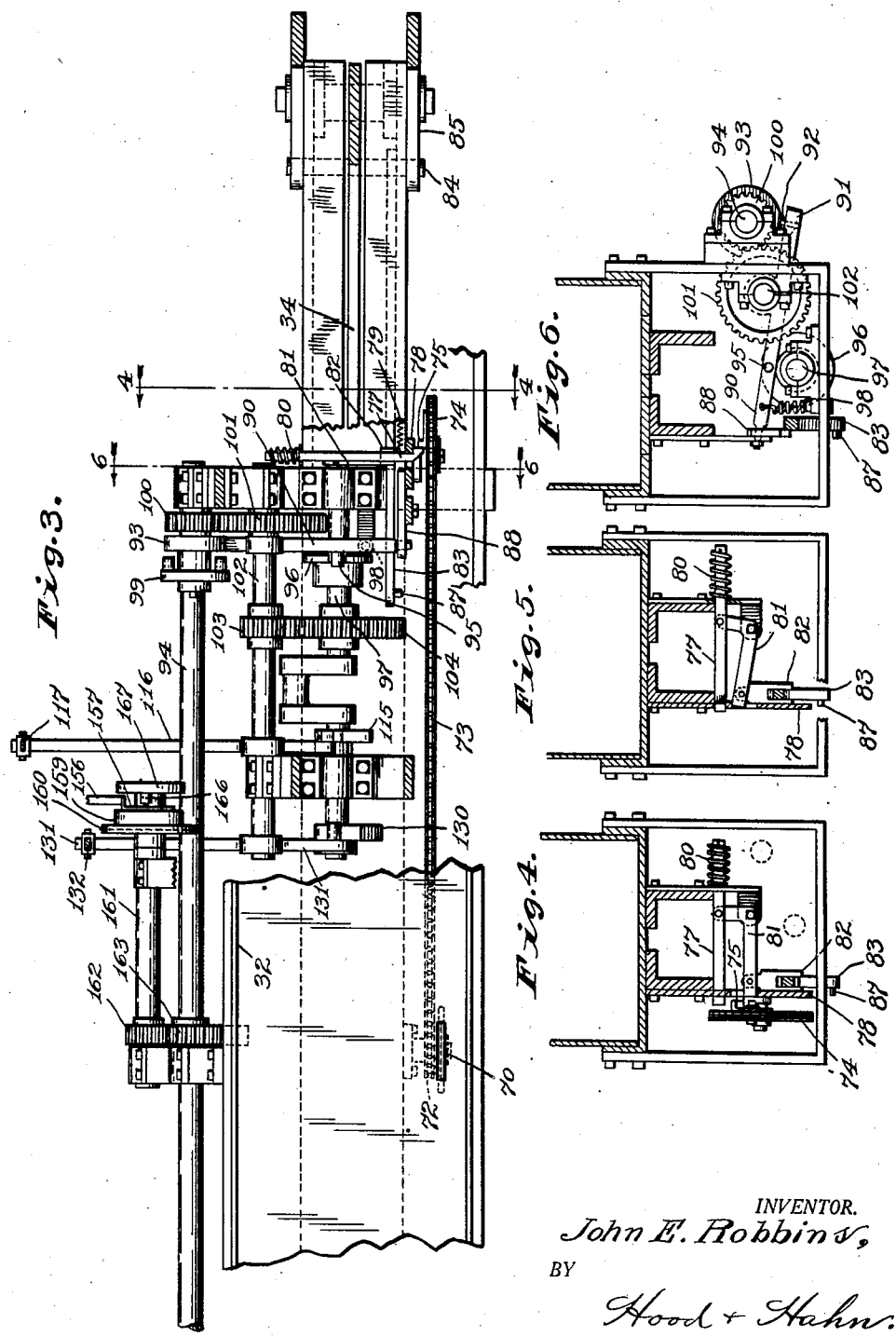

June 12, 1928.　　　　　　　　　　　　　　　　1,673,125
J. E. ROBBINS
HAY BALER
Filed July 25, 1924　　　7 Sheets-Sheet 3
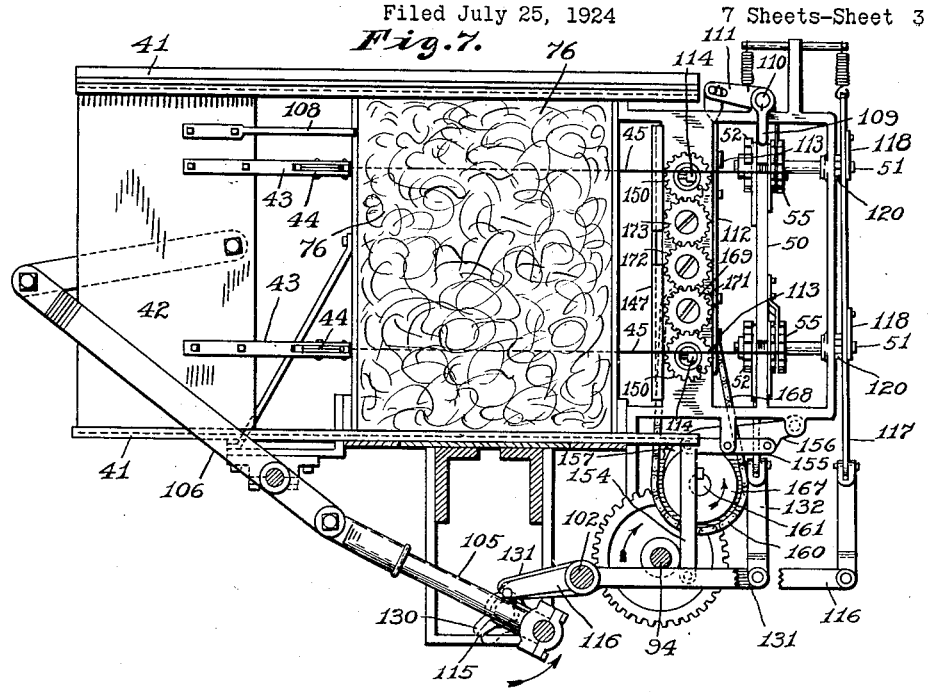
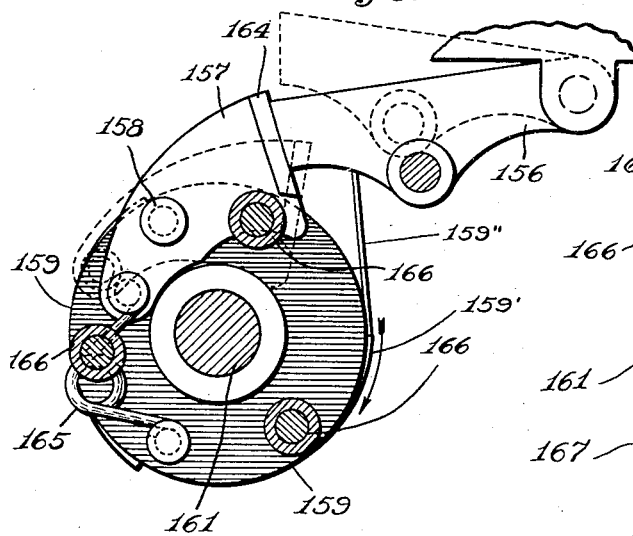
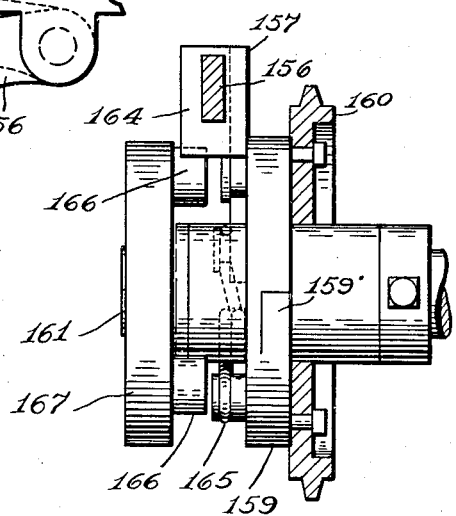
INVENTOR.
John E. Robbins,
BY
Hood & Hahn.
ATTORNEYS

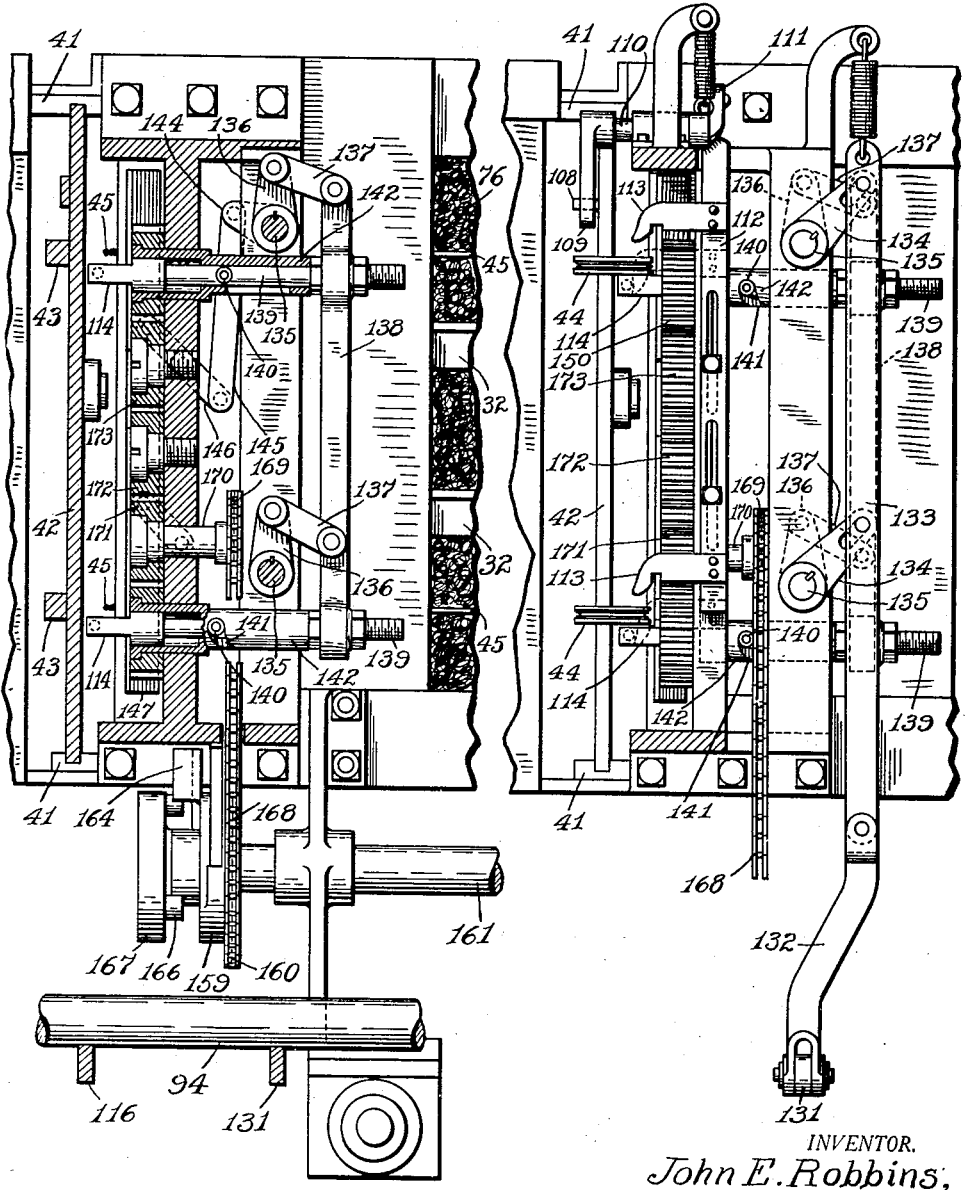

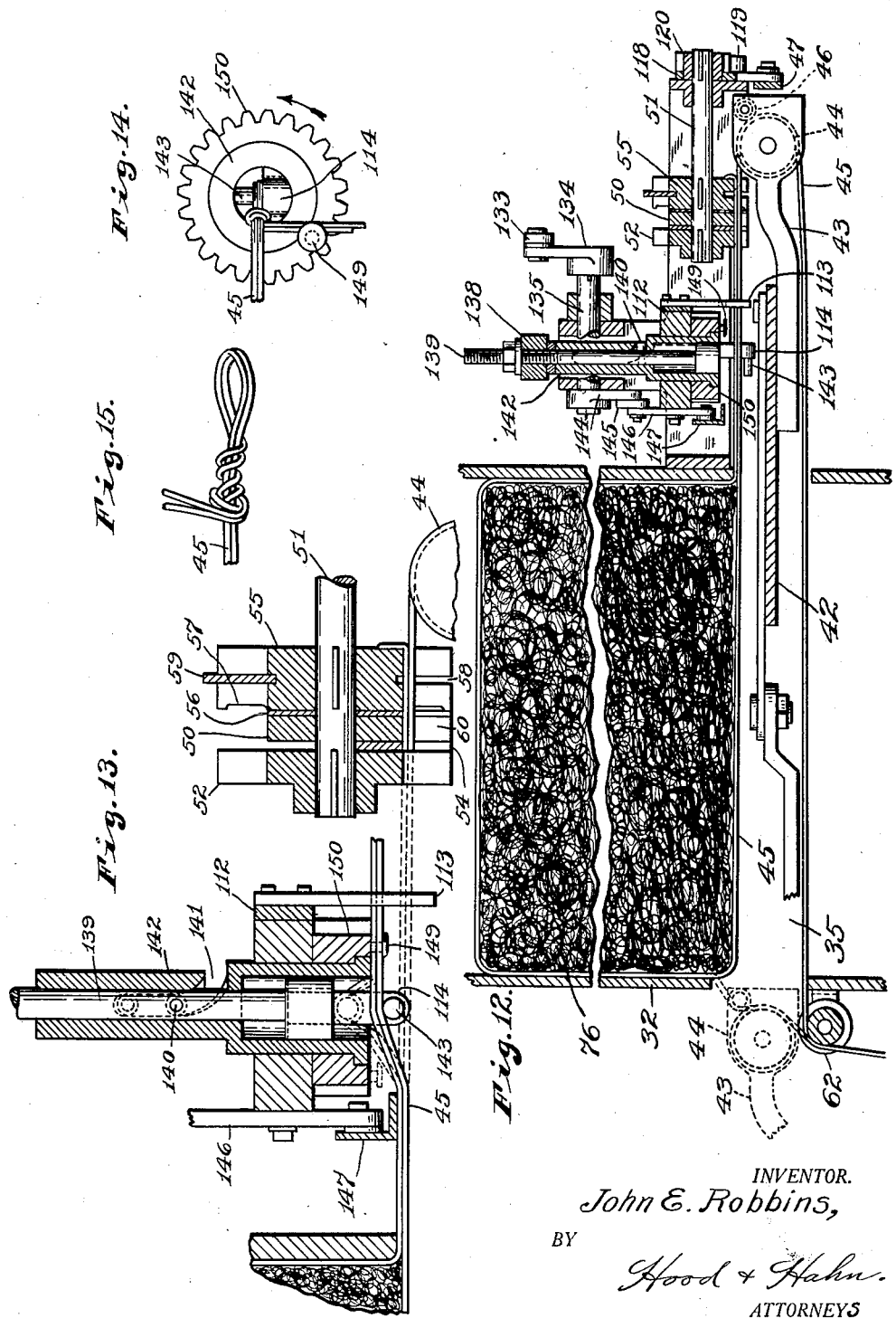

June 12, 1928.
J. E. ROBBINS
1,673,125
HAY BALER
Filed July 25, 1924     7 Sheets-Sheet 6
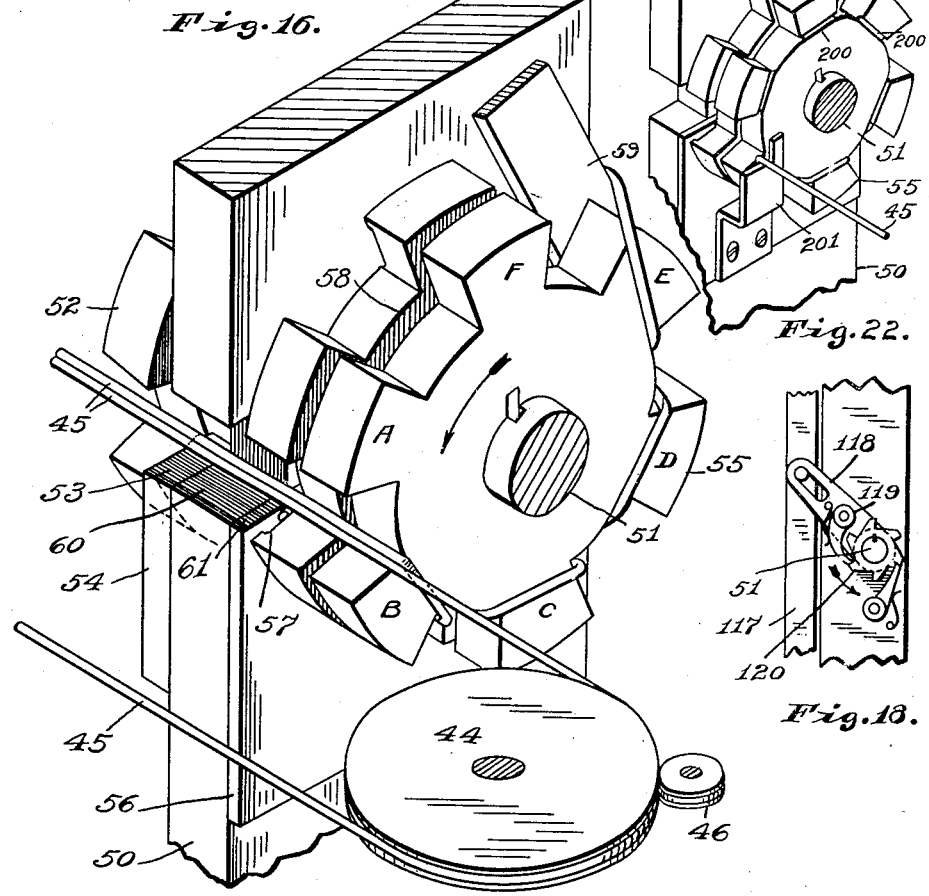
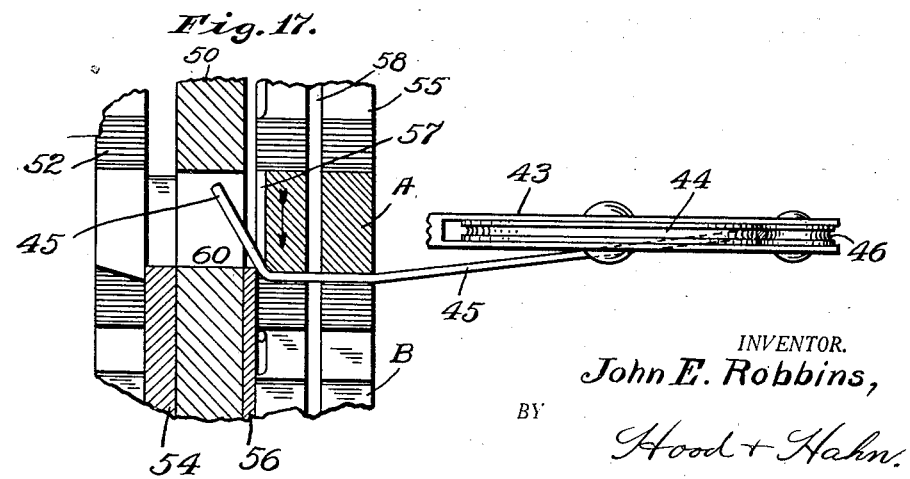
INVENTOR.
John E. Robbins,
BY
Hood + Hahn.
ATTORNEYS June 12, 1928.
J. E. ROBBINS
1,673,125
HAY BALER
Filed July 25, 1924   7 Sheets-Sheet 7
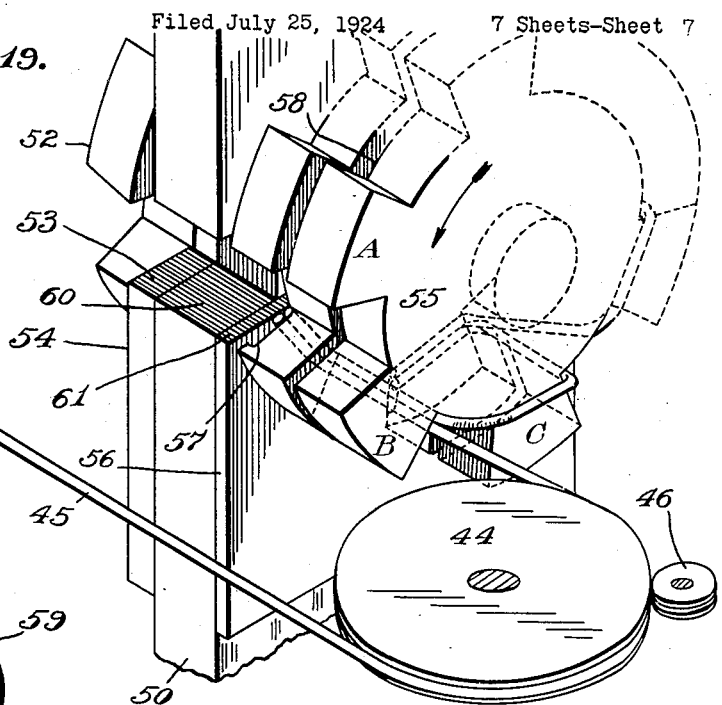
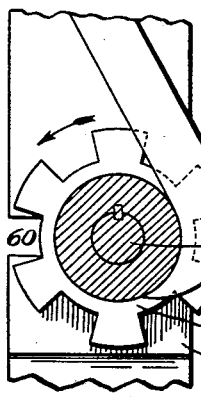
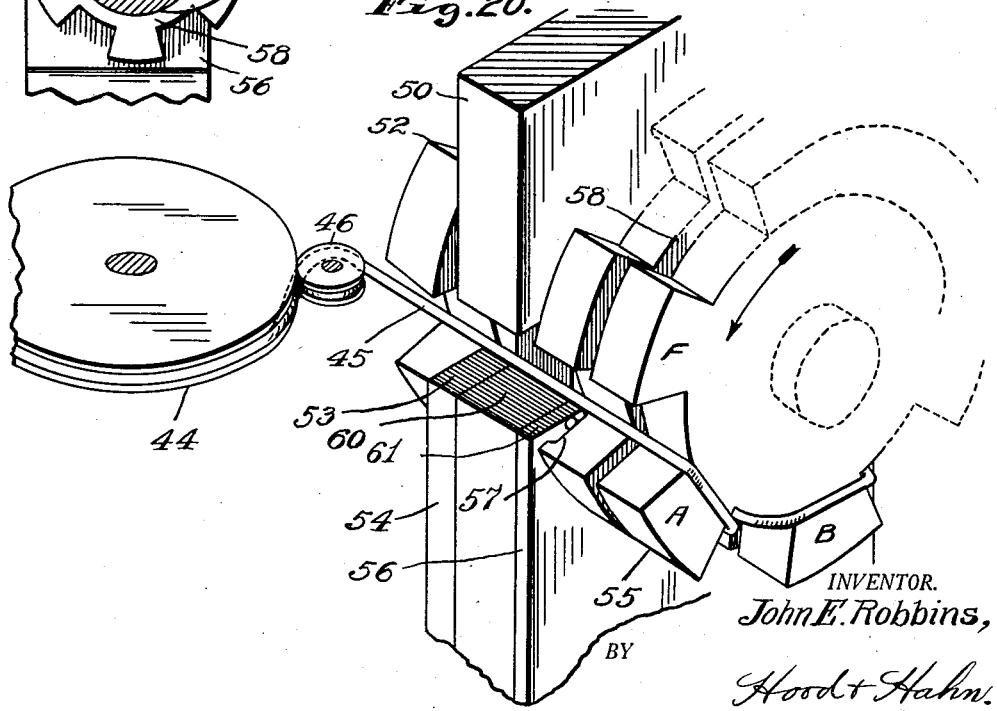
INVENTOR.
John E. Robbins,
BY
Hood + Hahn
ATTORNEYS Patented June 12, 1928.

1,673,125

UNITED STATES PATENT OFFICE.

JOHN E. ROBBINS, OF GREENSBURG, INDIANA.

HAY BALER.

Application filed July 25, 1924. Serial No. 728,076.

My invention relates to mechanism for applying baling wires to bales of hay or other similar material, and particularly to the mechanism for knotting the wire after it has been caused to embrace the bale.

One of the objects of my invention is to provide a knotting mechanism which will securely tie the wire and which will prevent the tendency of the bale to expand from causing the wire to slip before the knot is completely tied. Other objects and advantages of my invention will appear more fully in the accompanying specification and appended claims.

The accompanying drawings illustrate my invention.

Fig. 1 is a side elevation in partial vertical section of an apparatus embodying my invention;

Fig. 2 is a fragmentary detail of one of the trip mechanisms;

Fig. 3 is a plan view in partial horizontal section of a portion of the parts shown in Fig. 1;

Fig. 4 a section on line 4—4 of Fig. 3;

Fig. 5 a view similar to Fig. 4, with the parts in tripped position;

Fig. 6 a section on line 6—6 of Fig. 3;

Fig. 7 a transverse section on line 7—7 of Fig. 1;

Fig. 8 a sectional detail of one of the clutch mechanisms;

Fig. 9 a side elevation in partial vertical section, of the parts shown in Fig. 8;

Fig. 10 a vertical sectional detail on a larger scale of the twisting mechanism and adjacent parts;

Fig. 11 an elevation in partial vertical section of the parts shown in Fig. 10;

Fig. 12 a fragmentary horizontal section through one of the twister heads;

Fig. 13 a horizontal section, on a larger scale, through one of the twister heads;

Fig. 14 a fragmentary elevation of one of the twister heads;

Fig. 15 a perspective detail of the completed twist;

Fig. 16 a perspective detail of the wire-cutting and holding mechanism, in the position immediately following the final packing of the bale;

Fig. 17 a fragmentary section of the cutting and holding head, in an intermediate position, immediately following the cutting of the wire;

Fig. 18 a fragmentary detail, on a much smaller scale, of means for driving the cutter head;

Fig. 19 a view similar to Fig. 16 with the parts in the position immediately preceding the return of the wire-distributing head;

Fig. 20 a view similar to Fig. 19, showing the parts in the position immediately following the beginning of the return movement of the distributing head;

Fig. 21 a fragmentary section, on a smaller scale, showing the stripper finger in conjunction with the wire-holding head;

Fig. 22 a fragmentary perspective detail of a slight modification.

In the drawings, 30 indicates the bale-forming end of the main frame, comprising the hopper 31 and the bale guides 32 leading therefrom. Reciprocably mounted in the main frame, so as to traverse the hopper and enter the guides 32, is a packer head 33, reciprocated by any suitable means, such, for instance, as pitman 34.

Thus far, the construction is common and well known and needs no further description.

A transverse gap 35, the purpose of which will be made to appear, exists between the delivery end of hopper 31 and the receiving end of the guides 32 and adjacent the delivery side of the hopper I arrange a stationary cutter bar 36, immediately above the horizontal guides 37, a reciprocating cutter plate 38 being mounted in these guides so as to traverse the mouth of the hopper and co-operate with the cutter blade 36 upon each reciprocation of the packer plunger 33, plate 38 being connected by parts 39 with the packer head. Arranged in the gap 35 are transverse guideways 41, in which is supported a reciprocating plate 42, provided with two vertically-spaced arms 43, each of which carries a grooved wheel 44. This grooved wheel 44 is arranged in a horizontal plane and is formed to have the binding wire 45 pass around it, a small wheel 46 being arranged closely adjacent wheel 44, for a purpose which will appear.

Journaled in a vertical bar, or main plate, 50, adjacent gap 35 and substantially in the same horizontal plane with each wheel 44, is a shaft 51, which carries a cutter head 52, formed, in the present instance, with six circumferentially-spaced radial cutters which are adapted to co-operate with the end of a stationary cutter plate 54, secured to one face of bar 50.

Each shaft 51 also carries a holder head 55 which comprises six radial fingers A, B, C, D, E and F, which correspond to the six cutter fingers of the cutter head 52, the cutter fingers being set slightly in advance of the fingers of the holder head 55. A wear plate 56 is placed between bar 50 and the holder head 55 and the adjacent portion of each of the fingers of the holder head is grooved, as indicated at 57 (Fig. 17) to permit wire 45 to lie between the holder head finger and plate 56.

Head 55 is circumferentially grooved, as indicated at 58, so that a stripper finger 59 may be projected into said groove and serve to strip portions of wire 45 from head 55 in a manner which will be described.

Bar 50 is notched at 60 and plate 56 is notched at 61 to correspond with notch 53 of the cutter plate 54.

The initial end of wire 45 lies between finger B (Fig. 19) of head 55 and plate 56 and is passed from thence beneath said finger and around wheel 44 which is projected through gap 35 to the position shown in Fig. 12. Wire 45 passes from thence back through gap 35 around an idler 62 to the supply roll 63 which is mounted on a suitable pin 64 on the side of the hopper and is subject to the resistance offered by a compression spring 65.

With the parts in the position shown in Fig. 19, plate 42 is drawn back through gap 35, by a mechanism which will be described, until wheel 44 occupies the position shown in dotted lines at the left of Fig. 12, this movement passing wire 45 over the top of finger A of head 55, through notches 61, 60 and 53, and between two of the cutters of head 52, the wire being looped around wheel 46, as shown in Fig. 20. This movement stretches wire 45 across the mouth of guide 32.

The material to be baled is deposited in hopper 31 and successive quantities are driven by packer head 33 through the hopper against wires 45 and into guide 32, the wires 45 being thus drawn from rolls 63 into the guides 32 so as to embrace three sides of the bale, as indicated in Fig. 12.

As the bale progresses in size it comes into contact with a toothed wheel 70, which is projected into the bottom of guide 32 and is carried by a shaft 71, which carries a sprocket wheel 72 over which is passed a chain 73. Chain 73 extends over a timing sprocket wheel 74 which carries a cam 75 and when the bale 76 has advanced sufficiently, this cam comes into contact with a latch 77 which is normally hooked into the eye of a plate 78 and yieldingly held in that position by a spring 79 (Fig. 1). As soon as the cam 75 shifts catch 77, the spring 80 acts upon latch 77 to retract it through plate 78 so as to swing the bell crank lever 81 to the position shown in Fig. 5, thus lifting yoke 82. The yoke 82 (Fig. 2) forms a support for the free end of a finger 83 which is pivoted at 84 to a lever 85 connected at 86 to the packer head 33 and this finger carries at its free end a pin 87 which normally misses the adjacent end of lever 88 but, when raised, as described, comes into contact with the shoulder 89 of said lever 88 so as to swing said lever to the position shown in dotted lines in Fig. 2.

When lever 88 swings to the position shown in dotted lines in Fig. 2, it swings lever 90 to the position shown in Fig. 6 and thus withdraws stop finger 91 from in front of a finger 92 carried by a clutch member 93 journaled upon the constantly moving shaft 94 and also withdraws pin 95 from a notch in a collar 96 carried by crank shaft 97. Lever 90 is normally urged to the position shown in Fig. 6 by a spring 98.

The finger 92, and the clutch of which it forms a part, is similar to the clutch shown in Figs. 8 and 9, which will be described later, and when lever 90 is shifted, as described, the clutch member 93, through finger 92, becomes connected with the clutch member 99 carried by shaft 94 so that gear 100, operating through gear 101, shaft 102, and gears 103 and 104, rotates crank shaft 97.

Crank shaft 97 acting through pitman 105 (Fig. 7) swings lever 106 so as to project plate 42 from the position shown in Fig. 7 to the position shown in Fig. 12, and thus project wire 45 transversely across the completed bale and carry said wire through notches 53, 60 and 61, as indicated in Fig. 16.

When the plate 42 is projected to the position shown in Fig. 12, a finger 108 (Fig. 7) carried by said plate strikes a lever 109 carried by a rock shaft 110 and operates through arm 111 to move bar 112 (Figs. 7 and 11) downwardly, so as to bring fingers 113 down upon the two portions of wire 45, down upon the finger 114 of the twisting mechanism (Fig. 13) and when this occurs, a cam 115 on crank shaft 97, engages an arm 116 which pulls down upon bar 117.

Connected to bar 117 are ratchet arms 118, each carrying a pawl 119, which act upon ratchets 120, carried by shafts 51, (Fig. 18) so that said shafts, with cutters 52 and retainer heads 55, are advanced 1/6 of a rotation. Practically simultaneously with this movement, a cam 130, on shaft 97, engages a lever 131 which carries two links 132 and 133. Link 132 is connected to link 133 which in turn is connected to arms 134 carried by rock shafts 135, one for each twister mechanism, and these rock shafts carry arms 136 which are connected by links 137 with a cross head 138, said cross head being moved to the right from the position shown in Fig. 10, so as to shift shafts 139 of the twister mechanism axially.

Each of these shafts 139 carries a finger 114 and is provided with a pin 140 which lies in a spiral groove 141 in the tubular holder 142, so that, as these shafts 139 are shifted axially, they are also rotated so as to bring the pin 143 of each finger 114 first into the position shown in full lines in Fig. 13, and then into the position shown in dotted lines in said figure, so as to put a kink in the two portions of the wire 45 just before one of the cutter fingers of cutter 52 cuts the two wires over the edge of plate 54 at notch 53. One of the regular shafts 135 carries an arm 144 which is connected by link 145 and lever 146 with a bar 147 which is projected to the position shown in Fig. 13, so as to form an abutment for the two wires 45 and hold them in the position indicated in Fig. 13, so that those portions nearest the bale will be out of the path of movement of the severed ends of wire 45 when they are engaged and swung by the pin 149, carried by the twister gear 150.

Link 154 is connected by a lever 155 with a stop finger 156 which lies normally in position to engage and restrain a catch finger 157 (like catch finger 92). The catch finger 157 is pivoted at 158 on the clutch member 159 carried by a sprocket wheel 160 journaled on the constantly-moving shaft 161 which is connected by gears 162 and 163 with shaft 94 and this catch finger 157 is provided with a lateral projection 164 which, when the finger is restrained by the stop finger 156, is held, against the action of spring 165, out of the path of movement of a series of pins 166 carried by a clutch member 167 mounted on shaft 161, the arrangement being such that when, and so long as, stop finger 156 is in the position shown in dotted lines in Fig. 8, the lateral projection 164 will be engaged by one or another of pins 166 and sprocket wheel 160 will be rotated by shaft 161. Sprocket wheel 160 (Figs. 7 and 10) is connected by a chain 168 with a sprocket wheel 169 carried by a shaft 170 of an idler gear 171 which meshes with one of the twister gears 150 and with an idler gear 172 which meshes with an idler gear 173 meshing with the other twister gear 150, the arrangement being such that rotation of the sprocket wheel 160 will produce rotation of the twister gears 150 so as to wrap the free ends of the wire 45 around said wires, as indicated in Fig. 15, so as to tie the two wires together.

Cam 75 promptly passes latch 77 and the co-action between finger 83 and lever 88 draws yoke 82 downwardly against the action of spring 80, returning said yoke 82 and latch 77 to normal position, and as cams 115 and 130 promptly pass their respective levers 116 and 131, and as pin 95 rides upon the circumference of disk 96, it is apparent that, upon a complete rotation of crank shaft 97, the two clutches 93—99 and 160—167 will be automatically dissociated and when pin 95 drops into the notch of disk 96, the various parts are thus restored to normal inactive position, ready for another operation when the parts reach the position shown in Fig. 7.

The projection of wire 45 across the fourth side of the bale and the tying of the ends of the wire together by the loop shown in Fig. 15 takes place during a return stroke of the packer head 33 to the position shown in Fig. 1.

The advancement of shafts 51, brings one of the fingers of cutter 52 into position to sever the wires 45, as already described, and then brings one of the fingers (say A) of the holder 55 into engagement with said wires, bringing the freshly cut ends of said wires through the position shown in Fig. 17 carrying said wires up into the notches 57 and down alongside plate 56, so that on the return stroke of wheel 44, the wire 45 is looped around the finger A, as shown in Fig. 20, thus forming a firm anchorage for the wire preparatory to the formation of the next bale.

As the retainer head 55 advances step by step, the waste ends of wire 45 are ultimately brought into engagement with the stripper finger 39 and stripped off of the retainer fingers.

In Fig. 22, I show a slight modification from the construction shown in Figs. 16–21. In this form, the groove 200 is formed in the outer face of each tooth of wheel 55 at the root thereof, for the reception of the binding wire and a spring finger 201 is provided to co-operate with said wheel 55, so that the binding wire will be drawn down between wheel 55 and finger 201.

In order to prevent any backward movement of the clutch member 159, I provide said member with a plurality of ratchet teeth 159′ (Fig. 8) engaged by a spring detent 159″.

I claim:

1. In a knotter for baling machines, the combination with a relatively stationary member having a throat across which the wire to be knotted is adapted to lie, of means for engaging said wire and drawing the same into the throat to form a loop and means revoluble about said loop engaging one end of the wire and wrapping the same about the loop so formed.

2. In a knotter for baling machines, the combination with a relatively stationary member having a throat across which a pair of wires is adapted to be laid, of a laterally movable finger arranged to engage said wires and draw the same within said throat to double the wires upon themselves and means revoluble about said doubled wires engaging the free end of the wires to wrap the same about said doubled position.

3. In a knotter for baling machines, the combination with a relatively stationary member having a throat across which a pair of wires is adapted to lie, of a laterally movable finger arranged to engage said wires and draw the same into said throat for doubling the wires upon themselves, and a rotatable twister head having a finger revoluble about said doubled wires and arranged to engage the free end of the wires and wrap the same around said doubled portion.

4. In a knotter for baling machines, the combination with a relatively stationary member having a throat, means for laying a pair of wires across said throat, a finger having simultaneous axial and angular movement for engaging said wires and drawing the same into said throat and a twister having means revoluble about said wires and engaging the free end of said wires and arranged to twist the same around the loop formed by the drawing of the wires into said throat.

5. In a knotter for baling machines, the combination with a support having a throat, of means for laying a pair of wires across said throat, a laterally movable finger arranged to engage said wires and draw the same into said throat to form a loop in said wires, a twister wheel journaled on said support and provided with a pin revoluble about said loop and adapted to engage the free ends of the wires and wrap them around the loop so formed.

6. In a knotter for baling machines, the combination with a relatively stationary member having a throat, means for laying a pair of wires across said throat, a finger arranged to engage said wires and draw the same into said throat to form a loop therein, means engaging the wires on one side of said throat for projecting the same beyond the face of said throat and means for engaging the free ends of the wires and wrapping the same around the loop formed therein.

7. In a knotter for baling machines, the combination with a relatively stationary member having a throat, of means for projecting a pair of wires across said throat, a laterally and axially movable finger arranged to engage said wires and draw the same within said throat to form a loop therein, means for severing said wires from the source of supply and means revoluble about said loop for engaging the severed ends of said wires and wrapping the same around the loop so formed.

8. In a knotter for baling machines, the combination with a relatively stationary member having a throat, of means for laying a pair of wires across said throat, a laterally movable finger arranged to engage said wires and draw the same into said throat, means for engaging the free ends of the wires and rotating the same around said loop and means for engaging the wires and moving the same out of the path of the said rotating means.

9. In a baling machine, the combination with a knotter having a throat, of means for laying a pair of wires in parallel relation across said throat, a plunger reciprocable in said throat, a finger mounted on said plunger, means for depressing said wires into a position to be engaged by said finger, means for retracting said finger into said throat to draw the wires therein to form a loop, means for severing said wires and a rotatable member having a finger engaging the severed ends of said wires and wrapping them around the loop so formed.

10. In a baling machine, the combination with a knotter having a throat, of means for laying a pair of wires parallel across said throat, a plunger rotatably and reciprocably mounted in said throat having a finger arranged to engage said wires and draw the same into said throat to form a loop and a rotating twister having a finger revoluble about said wires arranged to engage the free ends of the wires and wrap the same around the loop so formed.

In witness whereof, I JOHN E. ROBBINS have hereunto set my hand at Greensburg, Indiana, this 22nd day of July, A. D. one thousand nine hundred and twenty four.

JOHN E. ROBBINS.